(12) United States Patent
Kim et al.

(10) Patent No.: US 11,310,764 B2
(45) Date of Patent: Apr. 19, 2022

(54) METHOD FOR RECEIVING PAGING MESSAGE AND TERMINAL FOR SAME

(71) Applicant: LG Electronics Inc., Seoul (KR)

(72) Inventors: Eunsun Kim, Seoul (KR); Kijun Kim, Seoul (KR); Hyunsoo Ko, Seoul (KR); Sukhyon Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 67 days.

(21) Appl. No.: 16/497,152

(22) PCT Filed: Mar. 23, 2018

(86) PCT No.: PCT/KR2018/003476
§ 371 (c)(1),
(2) Date: Sep. 24, 2019

(87) PCT Pub. No.: WO2018/174659
PCT Pub. Date: Sep. 27, 2018

(65) Prior Publication Data
US 2020/0383084 A1    Dec. 3, 2020

Related U.S. Application Data

(60) Provisional application No. 62/616,523, filed on Jan. 12, 2018, provisional application No. 62/480,556, (Continued)

(51) Int. Cl.
*H04Q 11/00* (2006.01)
*H04W 68/00* (2009.01)
(Continued)

(52) U.S. Cl.
CPC ....... *H04W 68/005* (2013.01); *H04W 72/042* (2013.01); *H04W 72/1273* (2013.01); *H04W 72/1289* (2013.01)

(58) Field of Classification Search
CPC .......... H04W 72/042; H04W 72/0446; H04W 72/0453; H04W 72/0493; H04W 74/0833;
(Continued)

(56) References Cited

U.S. PATENT DOCUMENTS

| 9,839,001 B2* | 12/2017 | Choi | ............. H04W 68/02 |
| 2007/0060175 A1* | 3/2007 | Park | ............. H04W 60/00 455/458 |

(Continued)

FOREIGN PATENT DOCUMENTS

| CN | 101730248 | 6/2010 |
| CN | 102238621 | 11/2011 |

(Continued)

OTHER PUBLICATIONS

International Search Report and Written Opinion in PCT Application No. PCT/KR2018/003476, dated Jun. 25, 2018, 19 pages (with English translation).

(Continued)

*Primary Examiner* — Khalid W Shaheed
(74) *Attorney, Agent, or Firm* — Fish & Richardson P.C.

(57) ABSTRACT

A method for a terminal receiving a paging message can comprise the steps of: receiving first downlink control information (DCI); and determining whether or not a paging indicator field is comprised in the first DCI.

20 Claims, 9 Drawing Sheets

Related U.S. Application Data filed on Apr. 3, 2017, provisional application No. 62/475,986, filed on Mar. 24, 2017.

(51) Int. Cl.
*H04W 72/04* (2009.01)
*H04W 72/12* (2009.01)

(58) Field of Classification Search
CPC . H04W 72/14; H04W 72/1289; H04W 24/10; H04W 8/24
See application file for complete search history.

(56) References Cited

U.S. PATENT DOCUMENTS

| | | | |
|---|---|---|---|
| 2008/0076425 | A1 | 3/2008 | Khetawat et al. |
| 2014/0050191 | A1 | 2/2014 | Kim et al. |
| 2015/0117271 | A1 | 4/2015 | Liang et al. |
| 2016/0100380 | A1* | 4/2016 | Jha .................. H04W 68/005 455/458 |

FOREIGN PATENT DOCUMENTS

| | | |
|---|---|---|
| CN | 104186017 | 12/2014 |
| KR | 101203841 | 11/2012 |
| KR | 1020150016371 | 2/2015 |
| WO | WO2010129814 | 11/2010 |
| WO | WO2014110822 | 7/2014 |
| WO | WO2016183768 | 11/2016 |
| WO | WO2016187851 | 12/2016 |
| WO | WO2017028024 | 2/2017 |

OTHER PUBLICATIONS

Ericsson, "NR Paging design," R1-1702126, 3GPP TSG-RAN WG1 Meeting #88, Athens, Greece, Feb. 13-17, 2017, 3 pages.
Intel Corporation, "Paging for NR," R1-1702183, 3GPP TSG RAN WG1 Meeting RAN1 #88, Athens, Greece, Feb. 13-17, 2017, 3 pages.
LG Electronics, "Discussion on paging design in NR," R1-1702440, 3GPP TSG RAN WG1 Meeting #88, Athens, Greece, Feb. 13-17, 2017, 4 pages.
Samsung, "Considerations of paging channel design," R1-1702907, 3GPP TSG RAN WG1 Meeting #88, Athens, Greece, Feb. 13-17, 2017, 5 pages.
Samsung, "Remaining Details on Paging Transmission," R1-163276, 3GPP TSG RAN WG1 Meeting #84bis, Busan, Korea, Apr. 11-15, 2016, 4 pages.
Sierra Wireless, "CSS Paging Discussion," R1-157180, 3GPP TSG RAN WG1 Meeting #83, Anaheim, USA, Nov. 15-22, 2015, 5 pages.
ZTE, ZTE Microelectronics, "Paging in NR," R1-1701579, 3GPP TSG RAN WG1 Meeting #88, Athens, Greece, Feb. 13-17, 2107, 7 pages.
Japanese Office Action in Japanese Application No. 2019-552618, dated Jul. 28, 2020, 5 pages (with English translation).
NTT Docomo, Inc., "SI change indication mechanism," R2-156422, 3GPP TSG-RAN2#92, Anaheim, USA, dated Nov. 16-20, 2015, 2 pages.
Panasonic, "Paging design for NR," R1-172761, 3GPP TSG RAN WG1 Meeting #88, Athens, Greece, dated Feb. 13-17, 2017, 3 pages.
United States Notice of Allowance in U.S. Appl. No. 16/709,387, dated Apr. 13, 2020, 11 pages.
Huawei, HiSilicon, "New DCI format to support efficient Paging transmission for MTC UEs," R1-156448, 3GPP TSG RAN WG1 Meeting #83, Anaheim, USA, dated Nov. 15-22, 2015, 4 pages.
ZTE, "NB-Paging Design for NB-IoT," R1-160476, 3GPP TSG RAN WG1 Meeting #84, St Julian's, Malta, dated Feb. 15-19, 2016, 3 pages.
EP Extended European Search Report in European Appln. No. 18770402.8, dated Jan. 15, 2021, 12 pages.
Huawei & HiSilicon, "DCI for NB-IoT," Rl-161803, Presented at 3GPP TSG RAN WG1 NB-IoT Ad-Hoc Meeting #2, Sophia-Antipolis, France, Mar. 22-24, 2016, 7 pages.
Huawei & HiSilicon, "DL Shared/group RS and UE-specific RS for control channel demodulation," R1-1611243, Presented at 3GPP TSG RAN WG1 Meeting #87, Reno, USA, Nov. 14-18, 2016, 4 pages.
Huawei & HiSilicon, "On paging transmission for MTC," R1-153767, Presented at 3GPP TSG RAN WG1 Meeting #82, Beijing, China, Aug. 24-28, 2015, 4 pages.
Huawei & HiSilicon, "Principles of new DCI for MTC," R1-153756, Presented at 3GPP TSG RAN WG1 Meeting #82, Beijing, China, Aug. 24-28, 2015, 4 pages.
Huawei, "Introduction of Rel-14 NB-IoT enhancements in 36.212," R1-1704148, Change Request, Presented at 3GPP TSG RAN WG1 Meeting #88, Athens, Greece, Feb. 13-17, 2017, 3 pages.
Interdigital, "Paging for NB-IoT," R1-160921, Presented at 3GPP TSG RAN WG1 Meeting #84, St Julian's, Malta, Feb. 15-19, 2016, 3 pages.
Li & Luo, "Implementation Of DCI Format Detection and Transmission Scheme Confirmation of PDSCH in LTE System," Transmitting & Receiving, Jan. 2013, 37(17), 6 pages (with English abstract).
NTT Docomo, Inc., "Study on New Radio Access Technology," RP-170376, Presented at 3GPP TSG RAN meeting #75, Dubrovnik, Croatia, Mar. 6-9, 2017, 157 pages.
Office Action in Chinese Appln. No. 201880020773.2, dated Oct. 11, 2021, 24 pages (with English translation).

\* cited by examiner

FIG. 10

| SI Flag (OFF) | RA field | Reserved |
|---|---|---|

| SI Flag (ON) | PI field | SI field | (Feedback flag) | Reserved |
|---|---|---|---|---|

METHOD FOR RECEIVING PAGING MESSAGE AND TERMINAL FOR SAME

CROSS-REFERENCE TO RELATED APPLICATIONS

This application is the National Phase of PCT International Application No. PCT/KR2018/003476, filed on 23 Mar. 2018, which claims priority under 35 U.S.C. 119(e) to U.S. Provisional Application No. 62/475,986, filed on 24 Mar. 2017; No. 62/480,556, filed on 3 Apr. 2017; and No. 62/616,523; filed on 12 Jan. 2018, all of which are incorporated by reference.

TECHNICAL FIELD

The present disclosure relates to wireless communication, and more particularly, to a method and user equipment (UE) for receiving a paging message.

BACKGROUND ART

With the introduction of a new radio access technology (RAT) system, as more and more communication devices require greater communication capacity, there is a need for mobile broadband communication enhanced over conventional RAT.

In addition, massive machine type communications (MTC) capable of providing a variety of services anywhere and anytime by connecting multiple devices and objects is one of important issues to be considered in the next-generation communications. Communication system design considering services/UEs sensitive to reliability and latency is also under discussion. Thus, the new RAT is to provide services considering enhanced mobile broadband (eMBB) communication, massive MTC (mMTC), and ultra-reliable and low latency communication (URLLC).

DISCLOSURE

Technical Problem

An aspect of the present disclosure devised to solve the conventional problem is to provide a method of receiving a paging message at a user equipment (UE).

Another aspect of the present disclosure is to provide a UE for receiving a paging message.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, a method of receiving a paging message at a user equipment (UE) includes receiving first downlink control information (DCI), and determining whether the first DCI includes a paging indicator (PI) field.

The method may further include, when the PI field is included in the first DCI, determining whether the PI field includes information about the UE, when the PI field includes the information about the UE, receiving second DCI including scheduling information required to receive the paging message, and receiving the paging message based on the second DCI. The method may further include acquiring updated system information at an update time of system information based on a system information field included in the first DCI. The first DCI further may include a field indicating whether a feedback of the UE is required, and when the feedback of the UE is required, the method may further include transmitting an uplink feedback of the UE. The UE may receive the paging message after transmitting the uplink feedback of the UE.

The method may further include, when the PI field is included in the first DCI, determining whether the PI field includes information about the UE, and when the PI field does not include the information about the UE, acquiring updated system information at an update time of system information based on a system information field included in the first DCI.

When the PI field is not included in the first DCI, the first DCI may include resource allocation information for transmission of the paging message, and the method may further include receiving the paging message based on the first DCI. The first DCI may further include a system information field, and updated system information may be acquired at an update time of system information based on the system information field.

In another aspect of the present disclosure, a UE for receiving a paging message includes a receiver configured to receive first DCI, and a processor configured to determine whether the first DCI includes a PI field. The processor may be configured to, when the PI field is included in the first DCI, determine whether the PI field includes information about the UE, when the PI field includes the information about the UE, receive second DCI including scheduling information required to receive the paging message, and receive the paging message based on the second DCI. The processor may be configured to acquire updated system information at an update time of system information based on a system information field included in the first DCI. The first DCI further may include a field indicating whether a feedback of the UE is required, and when the feedback of the UE is required, the UE may further include a transmitter configured to transmit an uplink feedback of the UE.

The processor may be configured to, when the PI field is included in the first DCI, determine whether the PI field includes information about the UE, and when the PI field does not include the information about the UE, acquire updated system information at an update time of system information based on a system information field included in the first DCI. The first DCI may further include a system information field, and the processor may be configured to acquire updated system information at an update time of system information based on the system information field.

Advantageous Effects

According to an embodiment of the present disclosure, a paging message may be received efficiently in a new radio access technology (NR) system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings:

FIG. 10 is a diagram illustrating an exemplary method of configuring some fields in paging DCI;

BEST MODE FOR CARRYING OUT THE INVENTION

Figure 1:
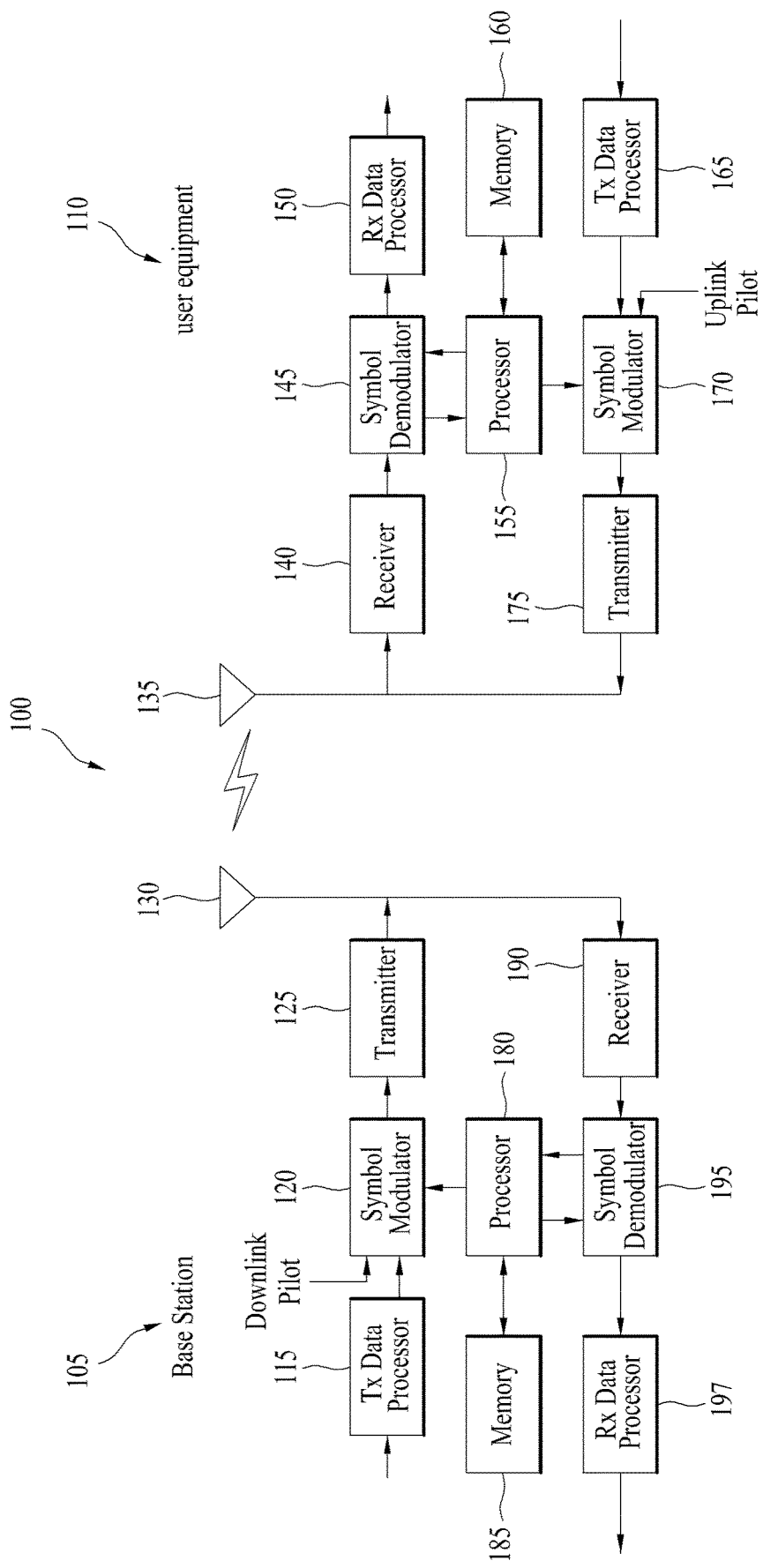
FIG. 1 is a block diagram illustrating configurations of a base station (BS) 105 and a user equipment (UE) 110 in a wireless communication system 100.

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes 3GPP LTE system, the following descriptions are applicable to other random mobile communication systems in a manner of excluding unique features of the 3GPP LTE.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that a base station (BS) is a common name of such a random node of a network stage communicating with a terminal as a Node B (NB), an eNode B (eNB), an access point (AP) and the like. Although the present specification is described based on IEEE 802.16m system, contents of the present disclosure may be applicable to various kinds of other communication systems.

In a mobile communication system, a user equipment is able to receive information in downlink and is able to transmit information in uplink as well. Information transmitted or received by the user equipment node may include various kinds of data and control information. In accordance with types and usages of the information transmitted or received by the user equipment, various physical channels may exist.

The embodiments of the present disclosure can be applied to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet Radio Service (GPRS)/enhanced data rates for GSM evolution (EDGE). OFDMA may be implemented as a radio technology such as IEEE 802.11 (Wi-Fi), IEEE 802.16 (WiMAX), IEEE 802.20, Evolved UTRA (E-UTRA), etc. UTRA is a part of universal mobile telecommunications system (UMTS). 3GPP LTE is a part of Evolved UMTS (E-UMTS) using E-UTRA, adopting OFDMA for DL and SC-FDMA for UL. LTE-advanced (LTE-A) is an evolution of 3GPP LTE.

Moreover, in the following description, specific terminologies are provided to help the understanding of the present disclosure. And, the use of the specific terminology can be modified into another form within the scope of the technical idea of the present disclosure.

FIG. 1 is a block diagram for configurations of a BS 105 and a UE 110 in a wireless communication system 100.

Although one BS 105 and one UE 110 are shown in the drawing to schematically represent a wireless communication system 100, the wireless communication system 100 may include at least one BS and/or at least one UE.

Referring to FIG. 1, a BS 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a UE 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the BS/UE 105/110 includes one antenna 130/135 in the drawing, each of the BS 105 and the UE 110 includes a plurality of antennas. Therefore, each of the BS 105 and the UE 110 of the present disclosure supports a MIMO (multiple input multiple output) system. And, the BS 105 according to the present disclosure may support both SU-MIMO (single user-MIMO) and MU-MIMO (multi user-MIMO) systems.

In downlink, the transmitted data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero. In each symbol duration, pilot symbols may be contiguously transmitted. In doing so, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the UE via the antenna 130.

In the configuration of the UE 110, the receiving antenna 135 receives the downlink signal from the BS and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the BS 105, respectively.

In the UE 110 in uplink, the transmitted data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the BS 105 via the antenna 135.

In the BS 105, the uplink signal is received from the UE 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the UE 110.

The processor 155/180 of the UE/BS 110/105 directs operations (e.g., control, adjustment, management, etc.) of the UE/BS 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with such a device configured to implement the present disclosure as ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present disclosure using firmware or software, the firmware or software may be configured to include modules, procedures, and/or functions for performing the above-explained functions or operations of the present disclosure. And, the firmware or software configured to implement the present disclosure is loaded in the processor 155/180 or saved in the memory 160/185 to be driven by the processor 155/180.

Layers of a radio protocol between a UE/BS and a wireless communication system (network) may be classified into 1st layer L1, 2nd layer L2 and 3rd layer L3 based on 3 lower layers of OSI (open system interconnection) model well known to communication systems. A physical layer belongs to the 1st layer and provides an information transfer service via a physical channel. RRC (radio resource control) layer belongs to the 3rd layer and provides control radio resourced between UE and network. A UE and a BS may be able to exchange RRC messages with each other through a wireless communication network and RRC layers.

In the present specification, although the processor 155/180 of the UE/BS performs an operation of processing signals and data except a function for the UE/BS 110/105 to receive or transmit a signal, for clarity, the processors 155 and 180 will not be mentioned in the following description specifically. In the following description, the processor 155/180 can be regarded as performing a series of operations such as a data processing and the like except a function of receiving or transmitting a signal without being specially mentioned.

Analog Beamforming

Because the wavelength of a signal is short in millimeter wave (mmW), it is possible to install multiple antennas over the same area. That is, the wavelength is 1 cm at 30 GHz, and thus a total of 100 antenna elements may be installed in a two-dimensional (2D) array with a 0.5λ (wavelength) spacing on a 5 by 5 cm panel. Therefore, a plurality of antenna elements are used to increase a beamforming (BF) gain and hence coverage or throughput in the mmW system.

In this case, when each antenna element has a transceiver unit (TXRU) to allow transmission power control and phase control on an antenna element basis, independent beamforming in each frequency resource is possible. However, installation of TXRUs in all of the 100 antenna elements is not cost-effective. Therefore, a method of mapping a plurality of antenna elements to one TXRU and adjusting the direction of a beam by means of an analog phase shifter has been considered. However, this analog BF is disadvantageous in that frequency selective beamforming is impossible because only one beam direction is generated across a total band.

As an intermediate form of digital BF and analog BF, hybrid BF with B TXRUs fewer than Q antenna elements may be considered. In hybrid BF, the number of beam directions available for simultaneous transmission is limited to B or less, depending on how B TXRUs and Q antenna elements are connected.

Now, a brief description will be given of paging in the 3GPP LTE/LTE-A system.

A paging procedure may be used for a network to transmit paging information to a UE in RRC_IDLE mode. Further, the paging procedure may be used for the network to indicate a change of system information to a UE in RRC_IDLE/RRC_CONNECTED mode. Further, the paging procedure may be used for the network to transmit an earthquake and Tsunami warning system (ETWS) primary notification and/or an ETWS secondary notification to a UE in the RRC_IDLE/RRC_CONNECTED mode. Further, the paging procedure may be used for the network to transmit a CMAS notification to a UE in the RRC_IDLE/RRC_CONNECTED mode.

A paging occasion (PO) will be described below.

In order to minimize the power consumption of UEs, a discontinuous reception (DRX) scheme is defined for the UEs. A UE using DRX may monitor whether a paging message is transmitted only in one PO every paging cycle (i.e., DRX cycle). One paging frame (PF) may refer to one radio frame which may include one or more POs. One PO may be one subframe in which there is a paging-RNTI (P-RNTI) transmitted on a PDCCH addressing a paging message. That is, a PO may be defined as a specific subframe in a PF in which the UE monitors a paging message.

A PF and a PO may be determined using the international mobile subscriber identity (IMSI) and DRX values of the UE. The UE may calculate the PF and the PO using its IMSI and DRX values. Further, an eNB may calculate a PF and a PO for each UE based on an IMSI value received from a mobility management entity (MME).

DRX parameters (i.e., paging/PCCH configuration information) may be included in a common radio resource configuration ('RadioResourceConfigCommon') information element (IE), which is an RRC message used to specify a common radio resource configuration. The common radio resource configuration IE may be transmitted in an RRC message such as an RRC Connection Reconfiguration message or a system information (SI) message. The SI message delivers one or more system information blocks (SIBs).

Table 1 below describes paging.

TABLE 1

Discontinuous Reception for paging
The UE may use Discontinuous Reception (DRX) in idle mode in order to reduce power consumption. One Paging Occasion (PO) is a subframe where
there may be P-RNTI transmitted on PDCCH or MPDCCH addressing the paging message. In P-RNTI transmitted on MPDCCH case, PO refers to the
starting subframe of MPDCCH repetitions.
One Paging Frame (PF) is one Radio Frame, which may contain one or multiple Paging Occasion(s). When DRX is used the UE needs only to monitor one PO per DRX cycle.
One Paging Narrowband (PNB) is one narrowband, on which the UE performs the paging message reception, PF, PO, and PNB are determined by
following formulae using the DRX parameters provided in System Information:
PF is given by following equation:
SFN mod T = (T div N)*(UE_ID mod N)
Index i_s pointing to PO from subframe pattern defined in 7.2 will be derived
from following calculation:
i_s = floor(UE_ID/N) mod Ns
If P-RNTI is monitored on MPDCCH, the PNB is determined by the following equation:
PNB = floor(UE_ID/(N*NS)) mod Nn
System Information DRX parameters stored in the UE shall be updated locally in the UE whenever the DRX parameter values are changed in SI. If
the UE has no IMSI, for instance when making an emergency call without USIM, the UE shall use as default identity UE_ID = 0 in the PF, i_s, and PNB formulas above.

TABLE 1-continued

The following Parameters are used for the calculation of the PF, i_s, and PNB:
T: DRX cycle of the UE. If a UE specific extended DRX value of 512 radio
frames is configured by upper layers according to 7.3, T = 512. Otherwise, T
is determined by the shortest of the UE specific DRX value, if allocated by
upper layers, and a default DRX value broadcast in system information. If UE
specific DRX is not configured by upper layers, the default value is applied.
nB: 4T, 2T, T, T/2, T/4, T/8, T/16, T/32.
N: min(T, nB)
Ns: max(1, nB/T)
Nn : number of paging narrowbands provided in system information
UE_ID:
IMSI mod 1024, if P-RNTI is monitored on PDCCH.
IMSI mod 16384, if P-RNTI is monitored on MPDCCH.
IMSI is given as sequence of digits of type Integer (0, . . . ,9). IMSI shall in
the formulae above be interpreted as a decimal integer number, where the first
digit given in the sequence represents the highest order digit.
For example:
IMSI = 12 (digit1 = 1, digit2 = 2)
In the calculations, this shall be interpreted as the decimal integer "12", not
"1 × 16 + 2 = 18".

[Table 2] to [Table 5] describe subframe patterns related to paging, respectively.

Table 2 and Table 3 illustrate paging-related subframe patterns in frequency division duplex (FDD).

When a P-RNTI is transmitted on a PDCCH, or on an MPDCCH of a system bandwidth larger than 3 MHz, POs are listed in Table 2 below.

TABLE 2

| Ns | PO when i_s = 0 | PO when i_s = 1 | PO when i_s = 2 | PO when i_s = 3 |
| --- | --- | --- | --- | --- |
| 1 | 9 | N/A | N/A | N/A |
| 2 | 4 | 9 | N/A | N/A |
| 4 | 0 | 4 | 5 | 9 |

When the P-RNTI is transmitted on an MPDCCH in system bandwidths of 1.4 MHz and 3 MHz, POs are listed in Table 3 below.

TABLE 3

| Ns | PO when i_s = 0 | PO when i_s = 1 | PO when i_s = 2 | PO when i_s = 3 |
| --- | --- | --- | --- | --- |
| 1 | 5 | N/A | N/A | N/A |
| 2 | 5 | 5 | N/A | N/A |
| 4 | 5 | 5 | 5 | 5 |

Table 4 and Table 5 illustrate paging-related subframe patterns in time division duplex (TDD) (all UL/DL configurations).

When a P-RNTI is transmitted on a PDCCH, or on an MPDCCH of a system bandwidth larger than 3 MHz, POs are listed in Table 4 below.

TABLE 4

| Ns | PO when i_s = 0 | PO when i_s = 1 | PO when i_s = 2 | PO when i_s = 3 |
|---|---|---|---|---|
| 1 | 0 | N/A | N/A | N/A |
| 2 | 0 | 5 | N/A | N/A |
| 4 | 0 | 1 | 5 | 6 |

When a P-RNTI is transmitted on an MPDCCH in system bandwidths of 1.4 MHz and 3 MHz, POs are listed in Table 5 below.

TABLE 5

| Ns | PO when i_s = 0 | PO when i_s = 1 | PO when i_s = 2 | PO when i_s = 3 |
|---|---|---|---|---|
| 1 | 1 | N/A | N/A | N/A |
| 2 | 1 | 6 | N/A | N/A |
| 4 | 1 | 1 | 6 | 6 |

Table 6 below describes paging in extended DRX.

TABLE 6

The UE may be configured by upper layers with an extended DRX (eDRX)
cycle TeDRX The UE may operate in extended DRX only if the cell indicates
support for eDRX in System Information.
If the UE is configured with a TeDRX cycle of 512 radio frames, it monitors
POs as defined in 7.1 with parameter T = 512. Otherwise, a UE configured
with eDRX monitors POs as defined in 7.1 (i.e, based on the upper layer
configured DRX value and a default DRX value determined in 7.1), during, a
periodic Paging Time Window (PTW) configured for the UE or until a paging
message including the UE's NAS identity is received for the UE during the
PTW, whichever is earlier. The PTW is UE-specific and is determined by a
Paging Hyperframe (PH), a starting position within the PH (PTW_start) and
an ending position (PTW_end). PH, PTW_start and PTW_end are given by
the following formulae:
The PH is the H-SFN satisfying the following equation:
H-SFN mod TeDRX, H = (UE_ID mod TeDRX, H), where
UE_ID: IMSI mod 1024
T eDRX, H eDRX cycle of the UE in Hyper-frames, (TeDRX, H = 1, 2 . . . , 256 Hyper-frames) and configured by upper layers
PTW_start denotes the first radio frame of the PH that is part the PTW and
has SFN satisfying the following equation:
SFN = 256* ieDRX, where
ieDRX = floor(UE_ID/TeDRX, H) mod 4
PTW_end is the last radio frame of the PTW and has SFN satisfying the following equation:
SFN = (PTW_start + L*100 − 1) mod 1024, where
L = Paging Time Window length (in seconds) configured by upper layers Table 7 below describes DCI format 6-2.

TABLE 7

DCI format 6-2 is used for paging and direct indication.
The following information is transmitted by means of the DCI format 6-2:
- Flag for paging/direct indication differentiation - 1 bit, with value 0 for direct indication and value 1 for paging
- If Flag=0:
- Direct Indication information - 8 bits provide direct indication of system information update and other fields, as defined in [6]
- Reserved information bits are added until the size is equal to that of format 6-2 with Flag=1

TABLE 7-continued

- If Flag=1:
- Resource block assignment - $\left\lceil \log_2 \left\lfloor \frac{N_{RB}^{DL}}{6} \right\rfloor \right\rceil$ bits for the narrowband index as defined in section 7.1.6 of [3]
- Modulation and coding scheme - 3 bits as defined in section 7.1.7 of [3]
-Repetition number - 3 bits as defined in section 7.1.11 of [3]
-DCI subframe repetition number - 2 bits as defined in section 9.1.5 of [3]

Figure 2:
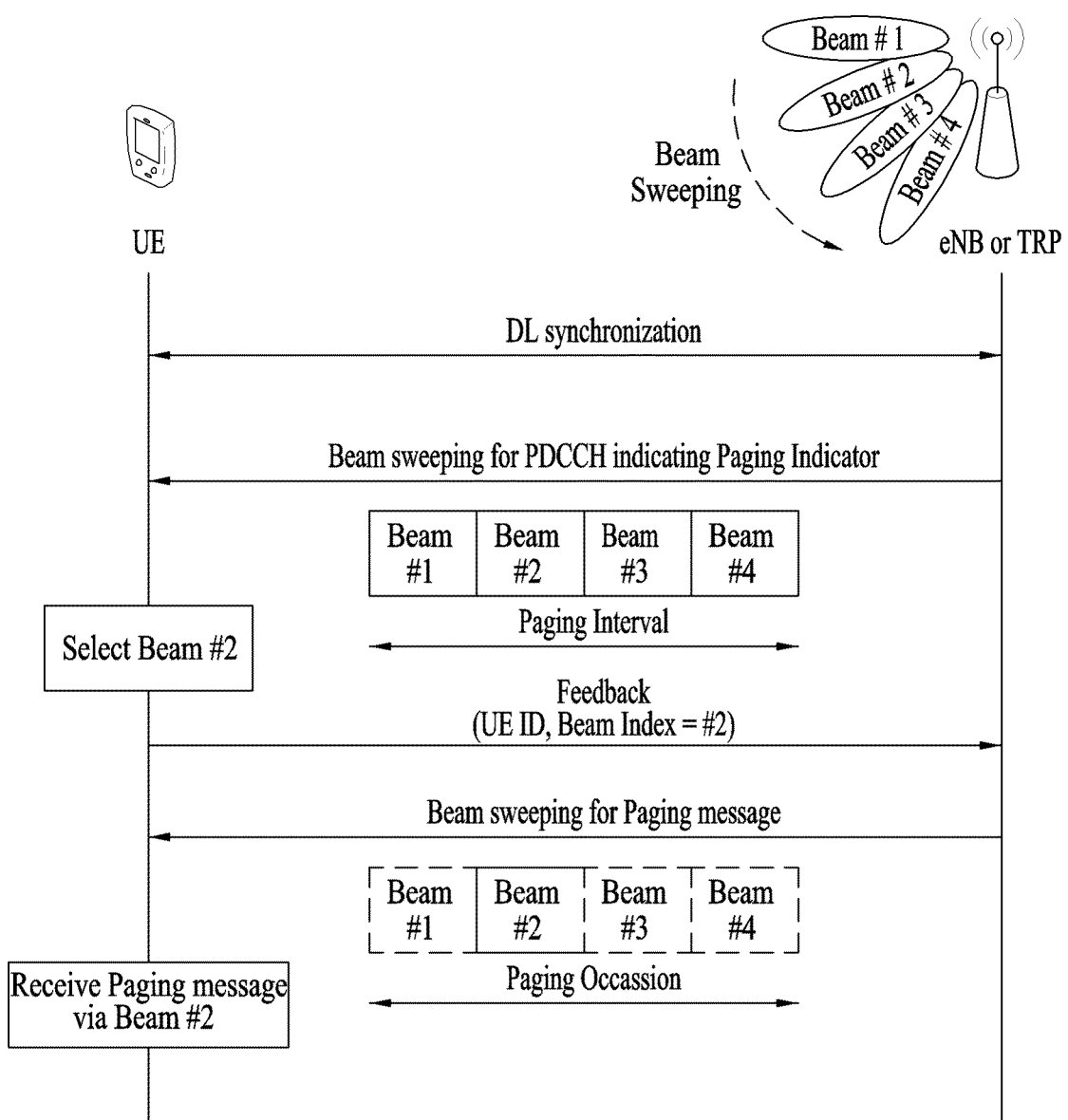
FIG. 2 is a diagram illustrating an exemplary paging frame (PF) and paging occasion (PO)

FIG. 2 is a diagram illustrating an exemplary PF and PO. Referring to FIG. 2, a plurality of PFs may be configured in one DTX cycle, and a plurality of POs may be configured in one PF.

NR paging will be described below.

Figure 3:
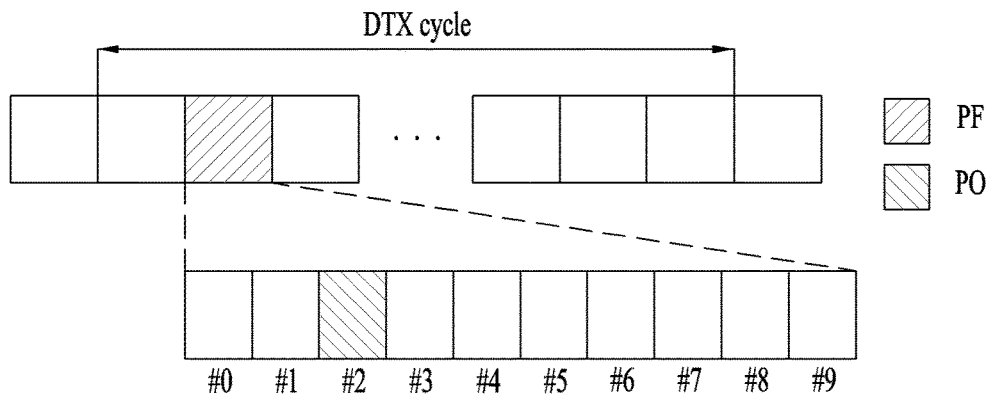
FIG. 3 is a diagram illustrating an exemplary paging procedure in new radio access technology (NR)

FIG. 3 is a diagram illustrating a paging procedure in NR. Referring to FIG. 3, a UE acquires DL synchronization with a transmission and reception point (TRP) or the cell of an eNB (S210). The UE receives a master information block (MIB) and/or SIB from the eNB. The MIB and/or SIB signals (or indicates) a system frame number (SFN) and a hyper SFN. In the present disclosure, a paging indicator (PI) corresponds to a wake-up signal that wakes up a UE.

The UE calculates a paging interval in which a paging channel is monitored in order to receive a PI or a paging message. The paging interval may be a PO, a paging time window, a paging (radio) frame, and/or a paging hyper frame calculated based on a UE ID and/or a selected beam index (e.g., #2). The paging interval is calculated based on the UE ID. The PI may be an RNTI, such as a P-RNTI on a PDCCH. The paging message is transmitted on a PDSCH.

The eNB transmits multiple beams in a paging interval in which the eNB sweeps all or a part of antenna beams (S220). Different beams are transmitted in different time intervals (e.g., symbols or subframes with a beam reference signal (BRS)). These beams carry a PI representing a group of UEs, a group of UE IDs, a particular type of UEs (e.g., delay-tolerant devices or vehicle UEs), a specific UE category, a specific service, or a service group. The PI may also indicate which beam index may be included in a feedback.

The UE receives different beams in different time intervals and measures the quality of each beam (S230). The UE selects a beam offering a highest measurement quality from among all the beams. Alternatively, the UE selects a beam with a measured quality equal to or greater than a threshold (S230).

When the UE receives a PI in a monitored PO and/or the PI is for paging the UE, the UE transmits a feedback to the eNB (S240). The feedback indicates the beam index of the selected beam. The feedback may be transmitted in one of the following options.

Option 1: A random access preamble, a random access preamble set, or a random access resource indicates the selected beam. Mapping between the beam and the random access preamble, the random access preamble set, or the random access resource is signaled to the UE by system information (SI) from the eNB.

Option 2: The feedback is a MAC control element including the selected beam index and the ID of the UE.

Option 3: The feedback is an RRC message including the selected beam index and the ID of the UE. The RRC message may be transmitted in an RRC connection establishment procedure, an RRC connection resume procedure, an RRC connection reestablishment procedure, or an RRC cell update procedure. The RRC message may be an RRC Connection Request message, an RRC Connection Reestablishment Request message, an RRC Connection Resume Request message, or a Cell Update message.

The UE may start a timer after transmitting the feedback. The feedback is transmitted on the selected beam.

Upon receipt of the feedback including the beam index of the selected beam (S240), the eNB transmits a paging message to the UE by the selected beam in a PO calculated based on the UE ID and/or the beam index (S250). During a predetermined time period after the feedback is transmitted, the UE monitors only the selected beam in all or a part of the PO in which the selected beam is transmitted (S260). That is, the UE monitors only the selected beam until the timer expires. The UE receives a timer value in SI from the eNB. If the paging message including the UE ID has not been received during the time period, that is, until the timer expires, the UE monitors all beams in paging intervals or POs.

Table 8 below describes a paging-related standard of RAN 2 in NR.

TABLE 8

10.1.1.2 Paging
The UE in RRC_IDLE and RRC_INACTIVE states may use Discontinuous
Reception (DRX) in order to reduce power consumption. While in
RRC_IDLE the UE monitors CN-initiated paging, in RRC_INACTIVE the
UE is reachable via RAN-initiated paging and CN-initiated paging. RAN
and
CN paging occasions overlap and same paging mechanism is used. The
UE
monitors one paging occasion per DRX cycle for the reception of paging
as
follows:
Paging DRX cycle length is configurable;
A default DRX cycle for CN paging is configurable via system information;
A UE specific DRX cycle for CN paging is configurable via UE dedicated signaling;
A RAN node can configure a UE with a DRX cycle for RAN paging. This
configuration can be UE specific.
The number of paging occasions in a DRX cycle is configurable via system
information;
A network may distribute UEs to the paging occasions based on UE id
when
multiple paging occasions are configured in the DRX cycle.
Paging occasion can consist of multiple time slots (e.g. subframe or
OFDM
symbol). The number of time slots in a paging occasion is configurable
via
system information.
A network may transmit a paging using a different set of DL Tx beam(s)
or
repetitions in each time slot.
NOTE 1:
FFS for the content of paging (e.g. paging message or paging indicator) when paging is transmitted using beam sweeping.
NOTE 2:
Transmission mechanism of paging in each time slot is up to RAN1 decision.

The applicant's contribution to RAN1 #88 meeting regarding paging transmission in NR will be described below. Table 9 and Table 10 below are the contents of the applicant's contribution.

TABLE 9

During RAN1 NR adhoc meeting, RAN1 identified several options for paging
channel design how to deliver paging messages. Among the options, we
prefer option 1 that paging message is scheduled by DCI(i.e. control
information for paging messages which can be interpreted as a paging
indicator(?)) and the paging message is transmitted based on the information
from the DCI. In designing of NR system, we need to avoid reserving
resources semi-statically for specific channels.

TABLE 9-continued

Figure 4:
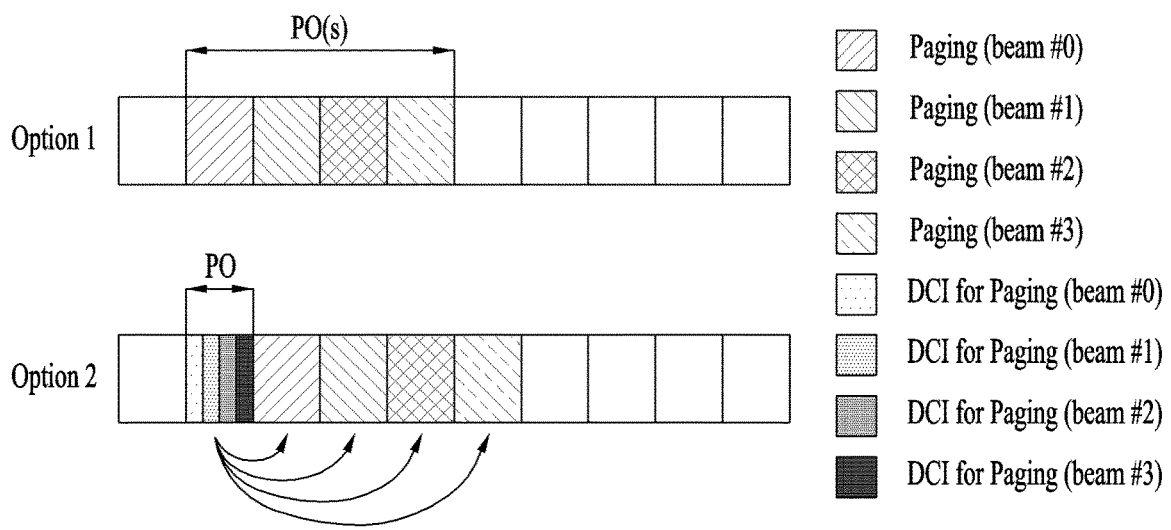
FIG. 4 is a diagram illustrating exemplary paging which is performed in conjunction with a multi-beam-based operation.

In LTE system, subframe and radio frame for UE monitoring of paging
message are defined as paging occasion (PO) and paging frame (PF),
respectively. During IDLE mode, UE needs only to monitor one PO per
DRX
cycle. Specifically, PF and PO for a UE can be determined by the following
equation. In FIG. 4(⊆ 4), an example of PF and PO is depicted.
PF: SFN mod T = (T/N) * (UE_ID mode N)
PO: i_s = floor (UE_ID) mode Ns
T: DRX cycle of UE
nB: Total number of POs in a DRX cycleN: Number of PFs in a DRX
cycle (e.g., N = min(T, nB))
Ns: Number of POs in a PF (e.g., Ns = min {T, nB/T})
UE_ID: IMSI mode 1024
For paging in NR system below 6 GHz, paging message transmission can
be
designed similar to paging in LTE system. However, in NR system for
high
frequency band above 6 GHz, hybrid beamforming which consists of digital
beamforming with limited dimension and analog beamforming using analog
phase shifter is mainly considered for coverage extension. Therefore, paging
message also needs to be beamformed transmission when the hybrid
beamforming based operation (e.g., multi-beam based operation) is
applied.
For the beamformed paging message in NR, the following two options can
be
considered.
Option 1
Paging message (with or without DL control) can be transmitted in PO(s)
with beam sweeping manner.
Option 2
DL control for paging message can be transmitted in PO(s) with beam
sweeping.
DL control indicates DL timing for paging message (e.g., paging message
can
be transmitted in subframes which are not POs)
For Option 1, UE may need to monitor multiple POs (e.g., M) corresponding
to multiple beams in a DRX cycle. For Option 2, DL control for paging
(e.g.,
scheduling DCI) can be transmitted with beam sweeping per PO and UE
may
need to monitor one or multiple POs (e.g., N ≤ M). Regarding this, Option
2
seems more power efficient than Option 1 since DL control for paging
may
need smaller number of PO(s) than paging message itself and UE can
monitor
DL control for paging with small bandwidth (e.g., bandwidth adaptation)
due
to smaller size of DL control than the paging message.

FIG. 4 is a diagram illustrating exemplary paging performed in conjunction with a multi-beam-based operation.

In conjunction with a multi-beam-based operation, two options described in Table 10 below may be considered for transmission of a paging message in the NR system.

TABLE 10

Option 1: Beam swept paging message (with or without DL control)
transmission in PO(s)
Option 2: Beam swept DL control for paging message transmission in
PO(s)
FFS: Details on DL control (e.g., scheduling DCI or paging message
indicator)
We prefer option 2 in FIG. 5 for the sake of UE energy saving, which can
reduce the size of PO. In order to improve paging channel performance.
combining of DCI for paging over different beams can be considered.
Similarly, combining of paging messages over different beams can also be
considered, as long as the contents are the same over multiple beams. If
the
specification determines that the DCIs for paging over different beams are
the
same, then UE combines the DCIs for different beams by default. Otherwise,

TABLE 10-continued a flag each DCIs for paging can indicate whether the UE can combine DCIs
or not.
It is FFS whether DCIs for paging is multiplexed with SS blocks or another
round of beam sweeping for paging is dedicated. In order to reduce the
resource that has to be beam-swept for broadcast channels, the paging
occasion should be within a subset of synchronization signal transmission
slots and the paging DCIs are to be located within or out-side of SS block in
frequency domain. Surely, if there is room for the paging DCIs within SS
block, that can be included in the SS block. It is up to the size of paging
(e.g.
paging indicator and/or paging message) whether it can be multiplexed within
the SS block, FDMed or TDMed Table 11 describes the applicant's contribution to 3GPP RAN1 Jan. Adhoc meeting regarding beam-swept paging downlink control information (DCI) or a PI.

TABLE 11

Paging delivery mechanism needs to be designed not only for UEs in
RRC_IDLE mode but also for UEs in RRC_INACTIVE mode and it is FFS
whether the same mechanism will be applied for both modes. Most of
procedures may be up to RAN2 design whether the paging message is
unicasted or broadcasted but more essential aspect of paging delivery/design
in RAN1 perspective is paging indication design. Hence, we propose to study
on the paging indication design including sequence design itself, whether it is
UE dedicated, and etc.

Feedback Mechanism on the Paging

Before entering DRX mode, a UE in the RRC idle or RRC inactive mode may receive, from the network (e.g., the eNB), signaling indicating a time when the UE needs to wake up to receive paging in the DRX mode for power saving. In the LTE system, a PO and a PF are designated as described before. The NR system differs from the LTE system in that a plurality of slots may exist in one PO due to the effect of beamforming in a multi-beam environment. This is described in Table 9, which will be described below.

A PO may include multiple time slots (e.g., subframes or OFDM symbols). The number of time slots in the PO may be configured by SI. The network may transmit paging by using a different set of DL transmission beam(s) or repeating a set of DL transmission beam(s) in each time slot. A paging message or PI may be used when paging is transmitted by beam sweeping.

In the LTE system, when a UE receives/decodes paging DCI (which may be referred to as various names such as "DCI") in a PO, the UE also receives a paging message in the PO. In contrast, if the UE receives paging DCI in a specific PO and also receives a paging message in the specific PO in NR, it means that the network should transmit the paging DCI and the paging message in the specific PO by beam sweeping. Therefore, the length of a time unit in the PO may become long, and the beam sweeping operation for a paging channel of the network may lead to waste of DL resources in the network.

In the present disclosure, therefore, from the viewpoint of a UE receiving paging, the UE may receive/decode paging DCI in a PO, and a paging message is not necessarily transmitted in the PO in which the paging DCI is transmitted. For more efficient resource utilization, the paging DCI is transmitted by beam sweeping, as described above. When the PO includes a plurality of slots (or time slots), the UE performs blind decoding on the paging DCI in units of an indicated slot length in the PO. However, in order to receive the paging in the idle or inactive mode, the UE should first perform time-frequency acquisition and beam acquisition. Thus, the UE wakes up at the transmission timing of a synchronization signal (SS) and measures beam-swept SS blocks, before the PO. The UE may determine the index of an SS block having the best reception quality. Because the paging DCI and the paging message transmitted in the PO are also transmitted in the same pattern as the beam pattern of the SS block, the UE which has determined the index of the SS block received with the best quality may determine a slot in the PO and a beam direction of paging for decoding.

In a PO, paging DCI and a paging message may be transmitted by beam sweeping. In other words, the UE receives the paging DCI or a PI to be described later in the PO, and then receives the paging message based on the paging DCI or PI received in the PO. The PI may be understood as a kind of wake-up signal for waking up the UE. Therefore, upon detection of information related to the UE ID of the UE in the PI, the UE determines that there is data directed to the UE, wakes up in the sleep mode or DRX mode, and prepares to receive the data. Further, the PI may be a signal that triggers the UE to transmit specific information on UL. For example, the UE may transmit a signal such as an ACK signal for the PI or a random access preamble. The eNB (or gNB) may determine the position of the target UE by receiving the signal from the UE, and transmit a paging message only in a corresponding direction. The paging message transmitted only in the direction may involve DCI transmission to enable decoding of the paging message.

Paging Indicator (PI) Design Scheme 1—PI within Paging DCI

A PI design and a method of detecting a PI at a UE are proposed below. A PI may instruct a specific UE, a specific UE group, or UEs of a specific beam (or beam group) to transmit UL signals.

In a method of transmitting a PI in paging DCI, a UE or a UE group may be indicated by a P-RNTI for each UE ID or a P-RNTI for each UE ID group. That is, multiple paging-RNTIs (P-RNTIs) are available in one system, a plurality of paging DCIs may be transmitted in each slot of a PO (paging DCIs may be multiplexed in time division multiplexing (TDM)), or in one slot of a PO (paging DCI may be multiplexed in frequency division multiplexing (FDM)), and each paging DCI may be transmitted with its cyclic redundancy check (CRC) covered with a different P-RNTI. When receiving paging DCI, the UE may derive its P-RNTI by using its (temporary) ID in the idle mode or inactive mode. In the LTE system, the UE finds a PO by using its ID according to Equation 1.

Index i_s pointing to PO from subframe pattern defined in 7.2 will be derived from following calculation:

$$i\_s = \text{floor}(UE\_ID/N) \bmod Ns \qquad [\text{Equation 1}]$$

Similarly, the UE may derive not only a PO but also a P-RNTI by using its ID in the present disclosure. Further, the UE may also derive which PI in a PI field of paging DCI decoded by using the P-RNTI is for the UE and which bit in the specific PI is assigned as an indicator bit to the UE. The eNB should preliminarily transmit necessary information to the UE so that the UE may derive the above information, that is, information about the position of the UE and UE grouping information in the PI field of the paging DCI.

More specifically, each paging DCI may include a PI field. There may be a plurality of PIs in one paging DCI, and the eNB may specify a UE which is supposed to transmit a feedback for the paging DCI by a PI. That is, the eNB may group UEs by using a P-RNTI, and then divide the UE group into sub-groups and specify a UE by using the PI and a bit field of the PI. The PI may be configured as a bitmap as in the following embodiment.

Figure 5:
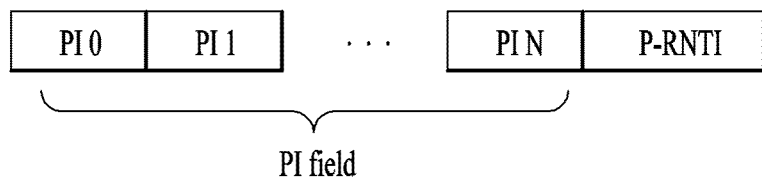
FIG. 5 is a diagram illustrating some exemplary fields in paging downlink control information (DCI)

FIG. 5 is a diagram illustrating some fields in paging DCI. One paging DCI may include a plurality of PI fields, PI 0, . . . , PI N. One PI may serve to sub-group UEs within a specific P-RNTI.

Figure 6:
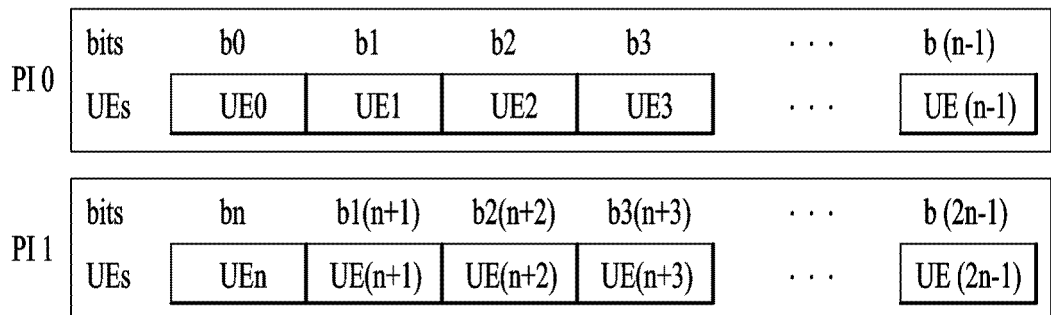
FIG. 6 is a diagram illustrating exemplary bitmaps in paging indicators (PIs)

FIG. 6 is a diagram illustrating exemplary bitmaps in PIs.

Bits of each PI may indicate specific UEs as in the embodiment of FIG. 6. The number of PIs and the number of UEs in each PI included in one paging DCI may be pre-configured. The UE should be able to derive which bit of which PI in a specific P-RNTI pages the UE by using its UE ID. In the embodiment of FIG. 6, while each bit of a PI field is shown as specifying or indicating one UE, the bit may also specify or indicate a UE group.

In PI design scheme 1, when a paging DCI monitoring/detection unit in a PO of a UE is a plurality of slots included in the PO, the UE attempts to detect paging DCI in each slot. The time unit and search space in which the UE attempts to detect the paging DCI may be pre-configured by network signaling.

PI Design Scheme 2—PI Sequence Transmission

Unlike the scheme in which the eNB transmits a PI in a specific field of paging DCI, the eNB may transmit a PI in a specific sequence. For the PI sequence transmission scheme, the network may assign a PI sequence separately to each individual UE. An entire sequence set available as PIs should be defined, and a particular sequence of the sequence set is pre-allocated to each UE. The UE attempts to detect a PI in a PO by using the sequence assigned by the network. When one PO includes a plurality of slots, a plurality of PIs may be transmitted in each of the slots in the PO. In this case, the network may group UEs and designate a frequency (e.g., subband, bandwidth part (BWP), or the like) for PI detection to each UE group. That is, a plurality of PIs may be transmitted in FDM in each slot of the PO. PI sequences with good cross-correlation performance may be grouped into the same group. The UE should be able to derive the PI sequence assigned to it at a corresponding time by using its ID. Further, the UE may also derive information about a frequency (e.g., subband) carrying the PI sequence, by the UE ID. Alternatively, the UE may derive the PI sequence by using its ID, the frequency (e.g., subband) for each PI sequence (or each PI sequence group) may be pre-configured, and the UE may use information about the pre-configured frequency for each PI sequence.

The UE detects a PI in the frequency (e.g., subband) carrying the PI sequence. Upon detection of the PI sequence assigned to the UE, the UE transmits a feedback for the PI sequence to the network on UL. A PI may be given statically on a UE basis. Alternatively, a PI may be a function of a subframe or slot index of a PO, an SFN or PF index, a P-RNTI and a UE ID, or a UE ID group or beam ID, and the UE attempts to detect the PI by deriving the PI from a function of the UE ID (UE ID group or beam ID) assigned to the UE, the P-RNTI, and a time of receiving the PO.

In PI design scheme 2, when a PI detection unit in a PO is a plurality of slots, a UE attempts PI detection in each slot. A time unit and search space in which the UE attempts to detect a PI may be pre-configured by network signaling.

Configurability of Paging Message Retrieval

A paging message may be delivered largely in the following two methods.

Method 1) Paging DCI/Paging Message Transmission Method

The eNB transmits paging DCI and a paging message in a PO. Alternatively, the eNB may transmit paging DCI in a PO, and transmit a paging message in a time/frequency resource other than the PO according to information in the paging DCI. The UE blind-detects the paging DCI in the PO.

Method 2) Paging Indicator (PI) Transmission Method

A PI is transmitted in a PO, and a DL paging message is triggered by a UL feedback from the UE. The network transmits a PI that wakes up a specific UE or UE group, and the target UE/UE group that has received the PI transmits a UL feedback in a predetermined resource. In this case, the feedback may use ACK signaling or a separately allocated preamble sequence/time/frequency resource.

In paging a UE, the network may support both of the above-described paging message transmission methods. That is, the network may use the method of transmitting paging DCI (with or without a paging message) in a PO, and may also separately transmit a paging physical channel (e.g., a PI sequence). When paging the UE, the network may signal to the UE in advance which one of Method 1 and Method 2 is to be used. When the UE receives signaling indicating Method 1, the UE attempts to detect paging DCI in a specific PO or all POs. When the UE receives signaling indicating that a paging message will be transmitted in Method 2 from the network, the UE attempts to detect a PI in a corresponding PO. When the paging message is large, that is, the size of the paging message is equal to or larger than a predetermined size (e.g., L bits), the network may trigger a UL feedback from the UE in the PI sequence method or in the method of including PI information in paging DCI. Upon detection of the paging DCI or the PI sequence, the UE performs the above-described subsequent operation.

UL Feedback on the PI

When the eNB triggers a UL signal transmission of the UE by transmitting a PI, resources to be used for the UL signal transmission of the UE may be configured as follows.

UL feedback resource allocation scheme 1) The UE may use a random access resource for a UL feedback transmission. In this case, a separate preamble and/or frequency resource may be allocated for the UL feedback transmission as a response to a PI. A preamble may be allocated to each UE or UE group. A P-RNTI may be allocated separately on a UE or UE group basis. In other words, there may be a plurality of paging UE groups in the system. One or more UEs may be included in each paging UE group. A PI (e.g., a sequence or a bit field) may be set for each paging UE group, that is, for each P-RNTI, and resources used for a UL feedback may be allocated on a P-RNTI basis. Resources may be allocated on a P-RNTI basis as follows.

A (RACH) preamble and time/frequency allocation (i.e., a pre-amble/time/frequency resource allocation) may be performed on a P-RNTI basis.

A preamble may be allocated on a P-RNTI basis, and a time/frequency for transmitting a preamble for a paging feedback may be allocated on a cell or paging zone basis (i.e., a plurality of paging groups share time/frequency resources rather than a time/frequency is allocated on a P-RNTI basis).

A preamble for a paging feedback may be allocated on a cell or paging zone basis (i.e., a plurality of paging groups share a preamble), and a time/frequency for transmitting a preamble may be allocated on a paging group/P-RNTI basis.

Upon detection of its PI, the UE should transmit a UL signal within a predetermined time (referred to as a feedback window). When signaling a paging configuration, the network may also signal the feedback window. The signaling may indicate a predetermined time period to be configured as the feedback window, or a predetermined time point, for example, a value indicating a time point after m slots.

Further, after transmitting the feedback on UL, the UE attempts to separately detect DCI for receiving a paging message. A time period during which the UE attempts to detect the DCI, that is, a response window, may be separately configured and signaled to the UE by the network. After transmitting the feedback, the UE monitors the DCI to receive the paging message during the time period of the response window. The UE attempts to detect the DCI during the response window time. The response window may be a time period other than a PO.

Although the UE may also refer to the DCI as paging DCI, the paging DCI in this case may not be beam-swept unlike paging DCI transmitted in the PO, and the time unit (e.g., slot length) monitored for DCI detection by the UE may also be different. Therefore, for the convenience of description, paging DCI transmitted in a PO may be referred to as first paging DCI, whereas paging DCI transmitted according to a feedback for a PI or transmitted to deliver scheduling information and resource allocation information for a paging message, required for transmission of the paging message may be referred to as second paging DCI.

In the case of Method 1, this scheme may also be applied to the method of transmitting only a PI without first paging DCI in a PO. The UE attempts to detect only a PI in a PO. Upon detection of the PI in the PO, the UE transmits a feedback for the PI in a predetermined resource within a feedback window, and attempts to detect paging DCI during a response window period after the feedback transmission. In this case, the paging DCI is not classified as the first paging DCI/the second paging DCI as described above.

UL feedback resource allocation scheme 2) When the eNB instructs the UE to transmit a UL feedback for a PI, the eNB may separately allocate (or designate/indicate) a time/frequency resource for the UL feedback by first paging DCI. The UL feedback may be understood as ACK information transmission. As many resources as RACH resources do not need to be allocated for the UL feedback. The resources may be allocated 1) on a P-RNTI basis, 2) on a PI basis, and 3) on a UE basis within a PI. A set of resources available for a feedback may be pre-configured. The eNB may indicate a resource to be used for the feedback of the specific UE, while paging the UE by the first paging DCI.

The UE may transmit a feedback for the first paging DCI and PI in the indicated feedback resource. As in scheme 1), the UE may attempt to monitor and detect second paging DCI in order to receive a paging message. A time period during which the UE attempts to detect the DCI, that is, a response window, may be separately configured and signaled to the UE by the network. The UE attempts to detect the DCI during the response window time. The response window may be a time period other than a PO. In another method, the first paging DCI may indicate the time period during which the UE attempts to detect the second paging DCI, the response window, or a time (slot or mini-slot) when the second paging DCI is transmitted.

This scheme may be applied to the method of transmitting first paging PCI including a PI in a PO by an eNB. Both of paging DCI and a paging message may be transmitted in a PO. If a feedback from a specific UE is not needed, a PI field may be omitted in the first paging DCI. In this case, in order to dynamically use the case of requesting a feedback and the case of not requesting a feedback, the UE should be able to distinguish DCI delivering a PI in a PO from DCI delivering scheduling information for a paging message. For example, the following methods may be used to distinguish the DCIs from each other.

1. Method of allocating different P-RNTIs—Different P-RNTIs may be allocated to DCI carrying a PI and DCI requesting scheduling information for a paging message.

2. Method of using a flag in DCI—A bit field indicating whether a feedback is requested or whether a PI field is present may be configured in a specific flag of DCI. The UE may determine whether a PI exists and whether to transmit a feedback by the configured field. Alternatively, the eNB may perform required scheduling for a paging message in a corresponding slot (slot in a PO), while commanding the UE to transmit a feedback by using the PI field. In this case, first paging DCI transmitted in a PO may include the following information.

Information 1) Paging DCI delivering scheduling information for a paging message may include a field indicating whether a PI exists and scheduling information (resource allocation information, MCS, etc.) for a paging message transmitted in a corresponding slot.

Information 2) In the case of paging DCI carrying a PI, when a field indicating whether a PI exists, PI(s), and a specific field of the PI is ON, the paging DCI may include information about a resource to be used for a UL feedback by a paged UE, and information about a resource in which second paging DCI may be transmitted (e.g., a transmission time, a second paging DCI monitoring window (response window), a second paging DCI search space, etc.).

Paging DCI Monitoring

The UE detects first paging DCI or a PI in each slot of a PO or in each time unit signaled by the network in the PO. Further, when a paging message is transmitted based on a feedback for the PI (any of a PI in the first paging DCI and a PI based on a sequence), the UE should receive/decode paging DCI (or second paging DCI) to receive a paging message. Therefore, a time and a detection unit for detecting the second paging DCI should be signaled. Unless otherwise signaled, the UE attempts to detect the second paging DCI within a response window in each same time unit as used for PI detection in the PO. Alternatively, unless otherwise signaled, if a default numerology is defined for data in a corresponding system band, the UE attempts to detect the second paging DCI in units of the numerology (slot/mini-slot). The UE may separately receive signaling indicating a time unit and other numerology (e.g., subcarrier spacing) required for detecting the second paging DCI from the network, and attempt to detect the DCI according to the information. That is, a unit for detecting the second paging DCI to receive a paging message based on a feedback of the UE may be different from a unit for detecting the PI (or first paging DCI) in the PO.

Paging DCI/Message Transmission and System Information Update Indication Method

Aside from the above-described PI and UE feedback indication, SI may be updated through paging. In the legacy LTE system, the eNB transmits information about system information update with a relatively small information size to the UE in DCI format 6-2. DCI format 6-2 may be used for paging, which delivers scheduling information for a paging message or indicates that SI has changed. A specific 1-bit flag may be configured in the DCI format to indicate whether the DCI schedules a paging message (e.g. if the flag=1) or whether the DCI includes SI update information (e.g., if the flag=0). When the DCI includes SI update information, system information, which can include system-InfoModification, etws-Indication, cmas-Indication, eab-ParamModification, and so on, may be transmitted. DCI format 6-2 serving these two functions is applicable in eMTC, without supporting the function of simultaneously transmitting a general SI update and a paging message.

Due to the introduction of multiple analog beams, the above-described paging schemes should be reinforced and optimized in performance in NR. Therefore, paging DCI may include 1) an indicator (e.g., flag) indicating the existence of a PI, 2) an indicator (e.g., flag) indicating whether UE feedback triggering is requested, 3) an indicator (e.g., flag) indicating whether SI update indication information is included in the paging DCI, and 4) resource allocation information for a paging message.

When the flag indicating whether a PI exists is ON, the paging DCI may include a PI field indicating target UE grouping and UE information of the paging DCI, and when the flag indicating whether a PI exists is OFF, the PI field of the paging DCI may be used for other purposes.

If the flag indicating whether UE feedback triggering is requested is ON, the paging DCI may include a field signaling information about resources (e.g., RACH resources) to be used for a UE feedback. If the information about resources to be used for the UE feedback is previously transmitted to the UE and thus agreed between the UE and the network, the resource information to be used for the UE feedback may not be included in the paging DCI. The UE may perform a UE feedback based on the pre-signaled resource information to be used for the UE feedback. On the contrary, if the flag indicating whether UE feedback triggering is requested is OFF, the UE does not perform the UL feedback. If the PI is transmitted, the UE receives a paging message after checking the PI, or if the PI is not transmitted, the UE receives the paging message according to paging message resource allocation information in the paging DCI.

If the flag indicating whether SI update indication information is included in the paging DCI is ON, it indicates that a specific field for transmitting the SI update indication information exists in the paging DCI. The UE checks whether SI has been updated in the corresponding paging DCI. If it is indicated that there is an SI update, the UE attempts to acquire SI at the time when the SI is transmitted.

If the flag indicating whether SI update indication information is included in the paging DCI is OFF, the UE does not attempt to acquire information indicating whether SI has been updated in the DCI. The specific field for transmitting the SI update indication information in the DCI may not exist or may be reserved for another purpose. Alternatively, this field may be used for other signaling purposes. However, when SI has been updated, the information indicating whether SI has been updated may be received even in the paging message.

The resource allocation information for a paging message may include information about a time/frequency, an MCS, and so on used for transmitting the paging message, and the network may signal the resource allocation information for the paging message to the UE.

Flag information may be included in paging DCI. The default value of the paging DCI amounts to OFF of all flags. Based on the above description, an embodiment of methods of configuring paging DCI is described below.

Figure 7:
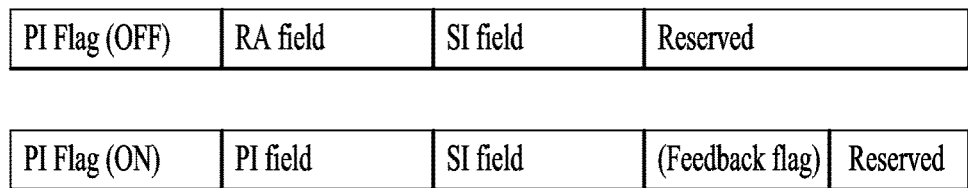
FIG. 7 is a diagram illustrating an exemplary method of configuring some fields in paging DCI.

FIG. 7 is a diagram illustrating a method of configuring some fields in paging DCI.

As illustrated in FIG. 7, if a PI flag field is defined and set to OFF (e.g., 0), the DCI may include a resource assignment (RA) field indicating scheduling information for a paging message and an SI update indication field. If the PI flag is ON (e.g., 1), the RA field for PI flag=OFF may be reinterpreted as a PI field, and the paging DCI may include the PI field delivering PI information and the SI field. When information about the UE is included in the PI field, the UE receives DCI carrying scheduling information for a paging message which will be transmitted later, and attempts to receive/demodulate the paging message according to RA information in the DCI. If the UE information is not included in the PI field, the UE may decode only the SI field to check whether SI has been updated. If there is an SI update, the UE may attempt to acquire SI according to an SI transmission period and then enter the sleep mode. If there is no SI update, the UE may enter the sleep mode immediately.

When the PI flag is ON, a feedback flag field may be optionally configured to request a feedback from the UE. If the feedback flag is ON, the UE may transmit a UL UE feedback in the presence of the UE information in the PI field. When the UE feedback flag is OFF, the UE receives DCI carrying scheduling information for a paging message to be transmitted, and the paging message Option 3 Operation When the information (e.g., UE ID) about the UE is included in the PI field, the UE receives DCI carrying scheduling information for a paging message which will be transmitted, and attempts to receive/demodulate the paging message according to RA information in the DCI.

Option 4 Operation

Alternatively, if the UE information (e.g., UE ID) is included in the PI field, the UE then transmits a RACH, a physical uplink control channel (PUCCH), and a sounding reflection symbol (SRS) on UL. Then, the UE receives DCI carrying scheduling information for a paging message which will be transmitted, and attempts to receive/demodulate the paging message according to RA information in the DCI.

Forward Compatibility Support

In a scheme of designing a system in stages, a paging scheme (referred to as option 1 for the convenience of description) is designed in an initial stage such that the network transmits paging DCI and a paging message, and the UE receives the paging DCI and receives/demodulates the paging message, and in an evolutionary stage, a paging scheme is designed in an evolutionary stage (referred to as option 3 for the convenience of description) such that the network transmits a PI, and among multiple UEs receiving the PI, a UE indicated by the PI subsequently receives paging DCI and receives/demodulates a paging message, or a paging scheme (referred to as option 2 for the convenience of description) is designed such that the network transmits a PI, and among multiple UEs receiving the PI, a UE indicated by the PI subsequently transmits a UL signal (e.g., RACH, PUCCH, SRS, or the like), receives DCI delivering scheduling information for a paging message which will transmitted, and attempts to receive/demodulate the paging message according to RA information in the received DCI.

In this evolutionary paging design, a paging operation of a network and a UE which implement the initial-stage option (e.g., option 1) (a paging operation when the UE receives DCI including a PI field), and a paging operation of a network and a terminal in a situation in which the network implements the evolutionary-stage option (e.g., option 2 or option 3), and a UE implementing the initial-stage option 1 and a UE implementing the evolutionary-stage option (e.g., option 2 or option 3) coexist will be described.

In the initial-stage option, in the absence of a UE to be paged among UEs which have woken up in a PO, a PI field of DCI is set to ON. Then, all UEs may enter the sleep mode again without reading a paging message. When some bit of an SI field is triggered (e.g., SI update), all UEs attempt to perform a related operation (e.g., SI update) at a specific time point after a predetermined time. Further, a UE in an RRC CONNECTED state determines whether the bit of the SI field is triggered irrespective of whether the PI field is ON/OFF, and performs a subsequent operation.

When there is a network implementing the evolutionary-stage option, and a UE implementing the initial-stage option and a UE implementing the evolutionary-stage option coexist, it may be determined whether to perform the paging procedure of the initial-stage option by using a PI field or the paging procedure of the evolutionary-stage option, according to the type of a UE to be paged among UEs which have woken up in a PO. For example, when UEs to be paged include both of a UE implementing the initial-stage option and a UE implementing the evolutionary-stage option, the network sets the PI field to OFF so that the paging procedure of the initial-stage option is performed. Upon receipt of the PI field, the initial-stage UE and the evolutionary-stage UE perform the paging procedure of the initial-stage option. In contrast, when UEs to be paged include only UEs implementing the evolutionary-stage option without any UE implementing the initial-stage option, the network sets the PI field to ON so that the initial-stage UE may enter the sleep mode. Among evolutionary-stage UEs, a UE to which paging is indicated by the PI performs the paging procedure of the evolutionary-stage option, and a UE which is not indicated by the PI enters the sleep mode.

When UE information (e.g., a UE ID) is not included in the PI field, the UE may enter the sleep mode again, and check an SI field (the SI field is used to deliver SI, and may indicate the absence of an SI update by a specific value (e.g., 0000 . . . 00)). If the SI field indicates the absence of an SI update, the UE may enter the sleep mode again.

Figure 9:
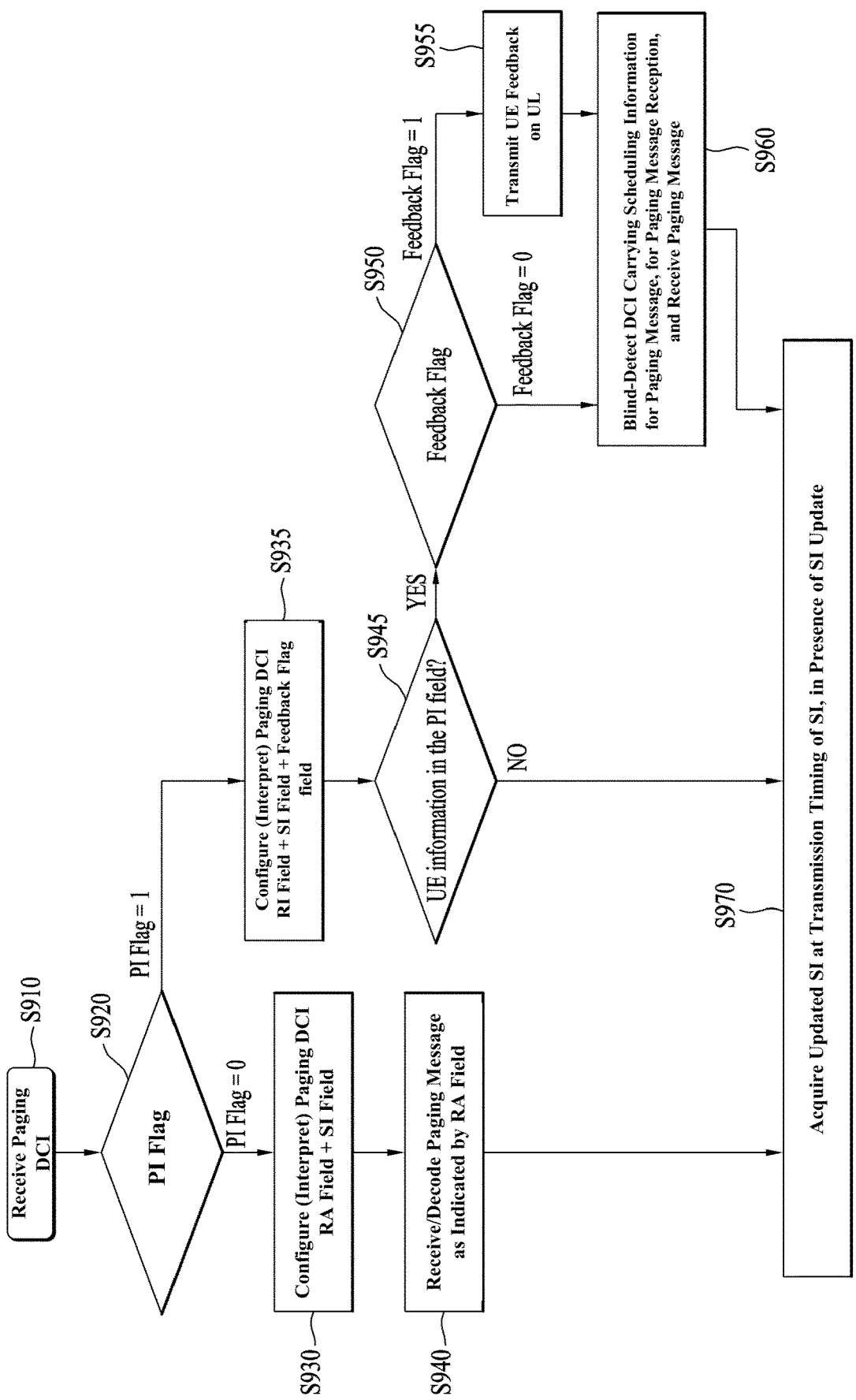
FIG. 9 is a flowchart illustrating an exemplary process related to reception of a paging message, in the presence of a UE feedback flag field in paging DCI.

If the PI flag is ON, the eNB may optionally set a feedback flag field to request a feedback from the UE. When the feedback flag is ON, the UE transmits a UL UE feedback in the presence of its information (e.g., UE ID) in the PI field. When the UE feedback flag is OFF, the UE receives DCI carrying scheduling information for a paging message, and the paging message. FIG. 9 is a flowchart illustrating an operation related to reception of a paging message, in the absence of a UE feedback flag field in paging DCI.

Figure 8:
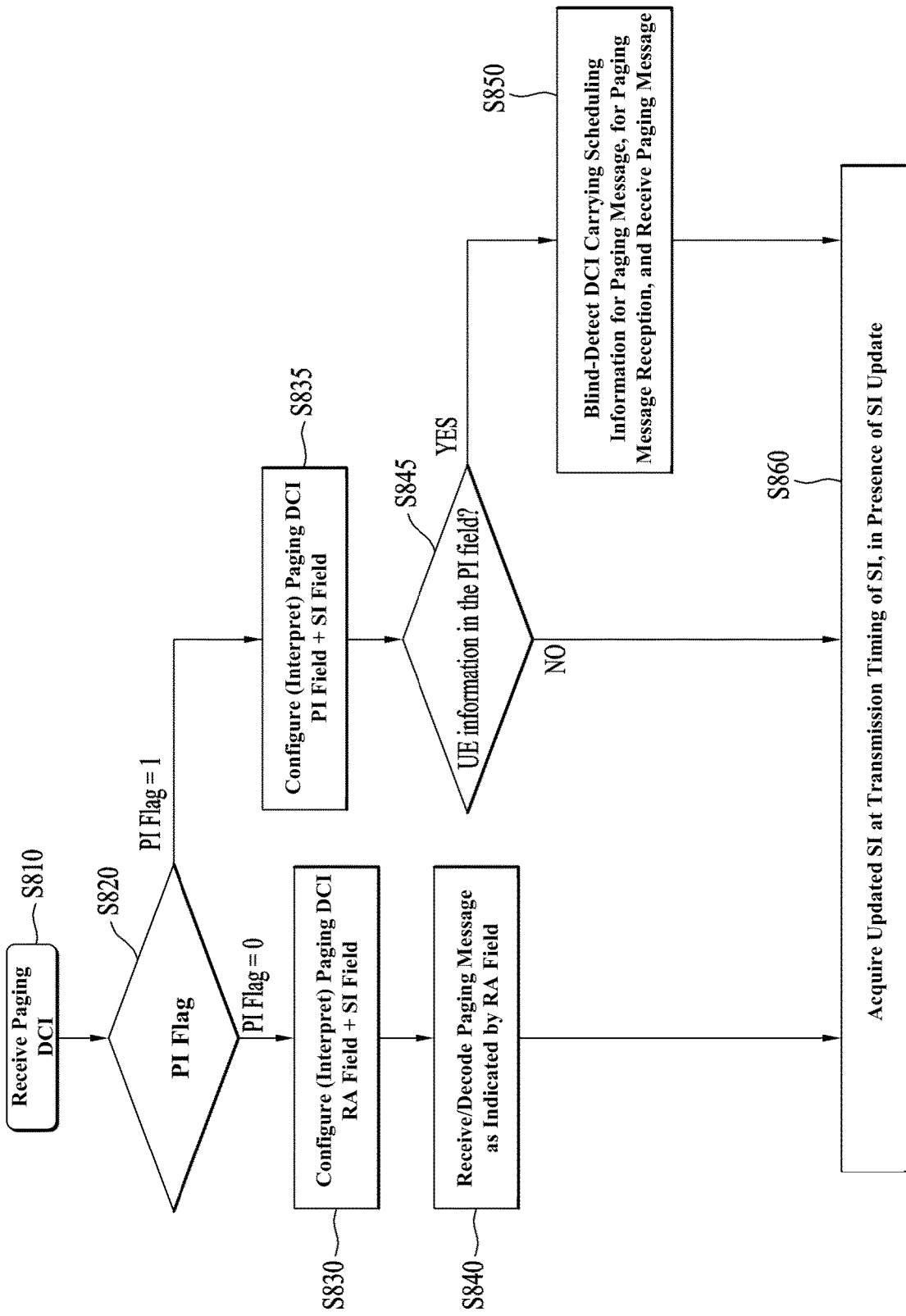
FIG. 8 is a flowchart illustrating an exemplary process related to reception of a paging message, in the absence of a user equipment (UE) feedback flag field in paging DCI.

Referring to FIG. 8, the UE receives paging DCI (S810). The paging DCI may include a PI flag, and the UE determines a value indicated by the PI flag (S820). When the PI flag is OFF (e.g., PI flag='0') in the paging DCI, the UE interprets the received paging DCI as including an RA information field providing scheduling information for a paging message and an SI update indication field (S830). The UE receives/decodes the paging message as indicated by the RA field (S840). In the presence of an SI update, the UE may then acquire updated SI at the transmission timing of SI (S860).

On the contrary, when the PI flag is ON (e.g., PI flag='1'), the UE interprets the paging DCI as including a PI field carrying PI information and an SI field by reinterpreting an RA field for a PI flag set to OFF as the PI field (S835).

The UE determines whether the PI field includes information about the UE (S845). If determining that the PI field includes the information about the UE, the UE may receive a paging message by blind-detecting DCI carrying scheduling information for the paging message (S850). In the presence of an SI update, the UE may acquire updated SI at the transmission timing of SI (S860). When determining that the PI field does not include the information about the UE (S845), the UE skips step S850. In the presence of an SI update, the UE may acquire updated SI at the transmission timing of SI (S860).

FIG. 9 is a flowchart illustrating an operation related to reception of a paging message in the presence of a UE feedback flag field in paging DCI.

Referring to FIG. 9, the UE receives paging DCI (S910). The paging DCI may include a PI flag, and the UE determines a value indicated by the PI flag (S920). When the PI flag is OFF (e.g., PI flag='0') in the paging DCI, the UE interprets the received paging DCI as including an RA information field providing scheduling information for a paging message and an SI update indication field (S930). The UE receives/decodes the paging message as indicated by the RA field (S940). In the presence of an SI update, the UE may then acquire updated SI at the transmission timing of SI (S960).

On the contrary, when the PI flag is ON (e.g., PI flag='1'), the UE interprets the paging DCI as including a PI field carrying PI information and an SI field by reinterpreting an RA field for a PI flag set to OFF as the PI field (S935).

The UE determines whether the PI field includes information about the UE (S945). If determining that the PI field includes the information about the UE, the UE determines a value indicated by a feedback flag (S950). When the feedback flag indicates '1', the UE transmits a UL feedback (S955). Then the UE may receive a paging message by blind-detecting DCI carrying scheduling information for the paging message (S960). In the presence of an SI update, the UE may acquire updated SI at the transmission timing of SI (S970).

When the feedback flag indicates '0' (i.e., indicating that a UL feedback is not required), the UE may receive a paging message by blind-detecting DCI carrying scheduling information for the paging message without transmitting a UL feedback (S960). In the presence of an SI update, the UE may acquire updated SI at the transmission timing of SI (S970). The feedback field may be omitted in the paging DCI. In this case, the UE operates in the same manner as when the feedback flag indicates '0' as described above.

When determining that the PI field does not include the information about the UE (S945), the UE may skip steps S950 and S960. In the presence of an SI update, the UE may acquire updated SI at the transmission timing of SI (S970).

In another embodiment of the method of configuring paging DCI, paging DCI may be configured as illustrated in FIG. 10.

FIG. 10 is a diagram illustrating an exemplary method of configuring some fields in paging DCI.

If an SI flag is OFF (e.g., 0), part of the paging DCI may include an RA field. If the SI flag is ON (e.g., 1), the UE may interpret the RA field as a PI field and an SI field. As in the illustrated case of FIG. 8, the eNB may set a feedback flag field to request UL feedbacks from UEs about which information is included in the PI field.

Forward Compatibility Support

In the initial-stage option, in the presence of a UE to be paged among UEs which have woken up in a PO, the eNB sets an SI field of DCI to OFF, and all UEs read an RA field and receive/demodulate a paging message. Further, in the initial-stage option, when some content of the SI field is triggered (e.g., SI update), the SI field is set to ON, and all UEs check a bit state of the SI field and attempt to perform a related operation (e.g., SI update) at a specific time after a predetermined time. Further, when the SI field is set to ON, a UE in an RRC CONNECTED state determines whether a bit of the SI field is triggered, and performs a subsequent operation.

When there is a network implementing the evolutionary-stage option, and a UE implementing the initial-stage option and a UE implementing the evolutionary-stage option coexist, it may be determined whether to perform the paging procedure of the initial-stage option by using an SI field or the paging procedure of the evolutionary-stage option, according to the type of a UE to be paged among UEs which have woken up in a PO. For example, when UEs to be paged include both of a UE implementing the initial-stage option and a UE implementing the evolutionary-stage option, the network sets the SI field to OFF so that the paging procedure of the initial-stage option is performed. Upon receipt of the PI field, the initial-stage UE and the evolutionary-stage UE perform the paging procedure of the initial-stage option. In contrast, when UEs to be paged include only UEs implementing the evolutionary-stage option without any UE implementing the initial-stage option, the network sets the SI field to ON so that the initial-stage UE may check the SI field and then determine whether to enter the sleep mode or perform an operation such as SI update. Further, all evolutionary-stage UEs may check the SI field and perform such an operation as SI update. Among the evolutionary-stage UEs, a UE to which paging is indicated by the PI performs the paging procedure of the evolutionary-stage option.

Figure 11:
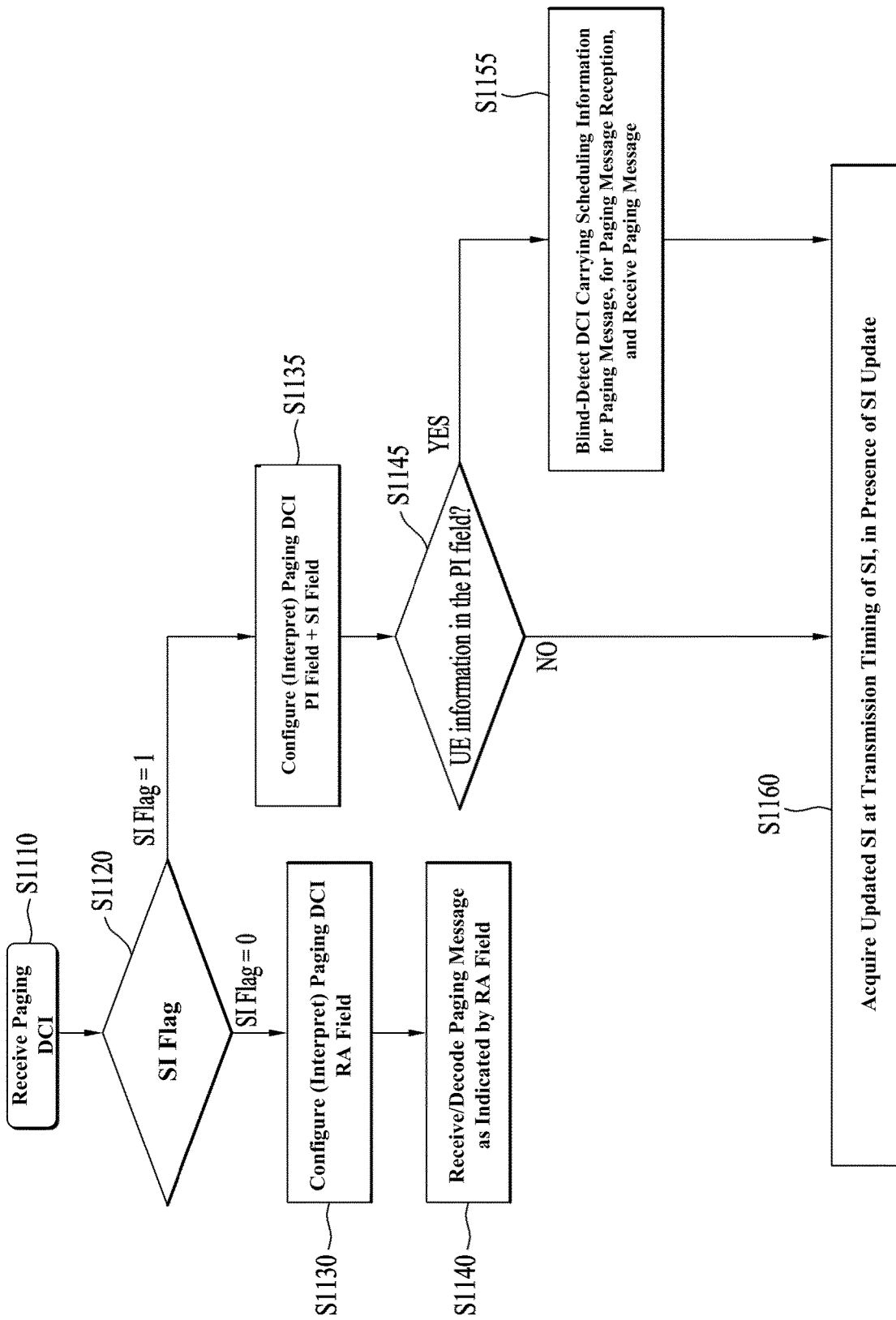
FIG. 11 a flowchart illustrating an exemplary process related to reception of a paging message, in the absence of a UE feedback flag field in paging DCI.

FIG. 11 is a flowchart illustrating an operation related to reception of a paging message in the absence of a UE feedback flag field in paging DCI.

Referring to FIG. 11, the UE receives paging DCI (S1110). The paging DCI may include an SI flag, and the UE determines a value indicated by the SI flag (S1120). When the SI flag is OFF (e.g., SI flag='0') in the paging DCI, the UE interprets the received paging DCI as including an RA information field providing scheduling information for a paging message (S1130). The UE receives/decodes the paging message as indicated by the RA field (S1140). In the presence of an SI update, the UE may then acquire updated SI at the transmission timing of SI (S1160).

On the contrary, when the SI flag is ON (e.g., PI flag='1'), the UE interprets the paging DCI as including a PI field carrying PI information and an SI field (S1135).

The UE determines whether the PI field includes information about the UE (S1145). If determining that the PI field includes the information about the UE, the UE may receive a paging message by blind-detecting DCI carrying scheduling information for the paging message (S1150). In the presence of an SI update, the UE may acquire updated SI at the transmission timing of SI (1160). When determining that the PI field does not include the information about the UE (S1145), the UE skips step S1155. In the presence of an SI update, the UE may acquire updated SI at the transmission timing of SI (S1160).

Figure 12:
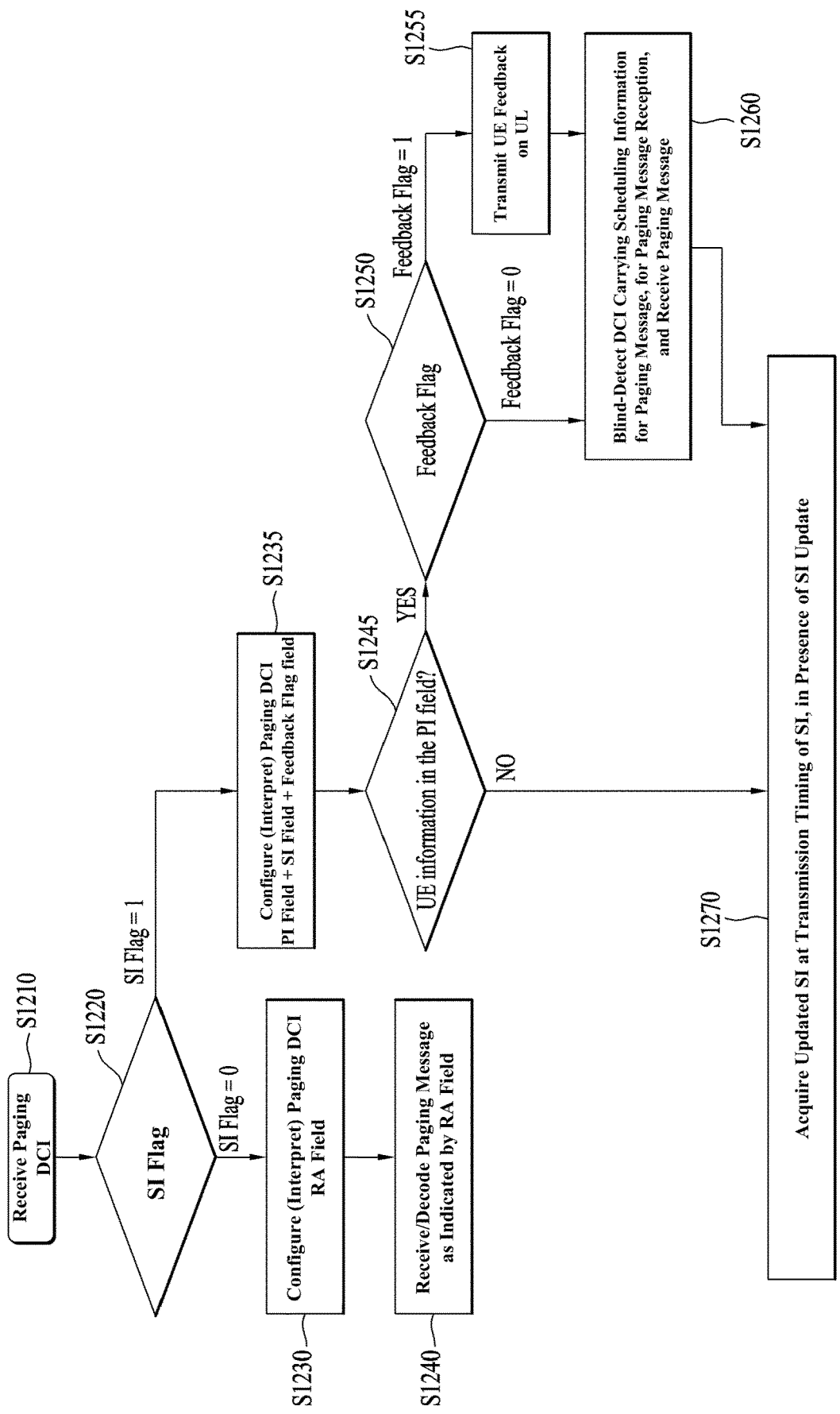
FIG. 12 a flowchart illustrating an exemplary process related to reception of a paging message, in the presence of a UE feedback flag field in paging DCI.

FIG. 12 is a flowchart illustrating an operation related to reception of a paging message in the presence of a UE feedback flag field in paging DCI.

Referring to FIG. 12, the UE receives paging DCI (S1210). The paging DCI may include an SI flag, and the UE determines a value indicated by the SI flag (S1220). When the SI flag is OFF (e.g., SI flag='0') in the paging DCI, the UE interprets the received paging DCI as including an RA information field providing scheduling information for a paging message (S1230). The UE receives/decodes the paging message as indicated by the RA field (S1240). In the presence of an SI update, the UE may then acquire updated SI at the transmission timing of SI (S1270).

On the contrary, when the SI flag is ON (e.g., SI flag='1'), the UE interprets the paging DCI as including a PI field carrying PI information, an SI field, and a feedback flag field by reinterpreting the RA field for a PI flag set to OFF as the PI field (S1035).

The UE determines whether the PI field includes information about the UE (S1245). If determining that the PI field includes the information about the UE, the UE determines a value indicated by the feedback flag (S1250). When the feedback flag indicates '1', the UE transmits a UL feedback (S1255). Then the UE may receive a paging message by blind-detecting DCI carrying scheduling information for the paging message (S1260). In the presence of an SI update, the UE may acquire updated SI at the transmission timing of SI (S1270).

When the feedback flag indicates '0' (i.e., indicating that a UL feedback is not required), the UE may receive a paging message by blind-detecting DCI carrying scheduling information for the paging message without transmitting a UL feedback (S1260). In the presence of an SI update, the UE may acquire updated SI at the transmission timing of SI (S1270).

When determining that the PI field does not include the information about the UE (S1245), the UE may skip steps S1250 to S1260. In the presence of an SI update, the UE may acquire updated SI at the transmission timing of SI (S1270).

The above-mentioned embodiments correspond to combinations of elements and features of the present disclosure in prescribed forms. And, it is able to consider that the respective elements or features are selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The method and UE for receiving a paging message may be industrially used in various wireless communication systems including 3GPP LTE/LTE-A, 5G, and NR systems.

The invention claimed is:

1. A method performed by a user equipment (UE) operating in a wireless communication system, the method comprising:
  receiving downlink control information (DCI) that comprises a cyclic redundancy check (CRC) scrambled by a paging radio network temporary identifier (P-RNTI) and
  based on the DCI including both (i) scheduling information for paging and (ii) a message for system information:
    determining the scheduling information for paging from a first bit field of the DCI; and
    determining the message for system information from a second bit field of the DCI.

2. The method of claim 1, wherein the DCI further comprises indication information that indicates whether the DCI includes at least one of (i) the scheduling information for paging or (ii) the message for system information.

3. The method of claim 2, further comprising:
  based on the indication information indicating that the DCI includes both (i) the scheduling information for paging and (ii) the message for system information:
    receiving a paging message based on the scheduling information for paging; and
    receiving updated system information based on the message for the system information.

4. The method of claim 1,
  wherein the message for system information includes an indication of system information modification, an indication for earthquake tsunami warning system (ETWS) notification, or an indication of commercial mobile alert system (CMAS) notification.

5. The method of claim 1,
  wherein the scheduling information for paging includes time resource assignment information, frequency resource assignment information, and modulation and coding scheme (MCS) information.

6. A user equipment (UE) configured to operate in a wireless communication system, the UE comprising:
  a transceiver;
  at least one processor; and
  at least one computer memory operably connectable to the at least one processor and storing instructions that, when executed by the at least one processor, perform operations comprising: receiving downlink control information (DCI) that comprises a cyclic redundancy check (CRC) scrambled by a paging radio network temporary identifier (P-RNTI) and
  based on the DCI including both (i) scheduling information for paging and (ii) a message for system information:
    determining the scheduling information for paging from a first bit field of the DCI; and
    determining the message for system information from a second bit field of the DCI.

7. The UE of claim 6,
  wherein the DCI further comprises indication information that indicates whether the DCI includes at least one of (i) the scheduling information for paging or (ii) the message for system information.

8. The UE of claim 7, wherein the operations further comprise:
  based on the indication information indicating that the DCI includes both (i) the scheduling information for paging and (ii) the message for system information:
    receiving a paging message based on the scheduling information for paging; and
    receiving updated system information based on the message for the system information.

9. The UE of claim 7,
  wherein the message for system information includes an indication of system information modification, an indication for earthquake tsunami warning system (ETWS) notification, or an indication of commercial mobile alert system (CMAS) notification.

10. The UE of claim 6,
  wherein the scheduling information for paging includes time resource assignment information, frequency resource assignment information, and modulation and coding scheme (MCS) information.

11. A method performed by a base station (BS) operating in a wireless communication system, the method comprising:
  transmitting downlink control information (DCI) that comprises a cyclic redundancy check (CRC) scrambled by a paging radio network temporary identifier (P-RNTI),
  wherein based on the DCI including both (i) scheduling information for paging and (ii) a message for system information:
    the scheduling information for paging is included in a first bit of the DCI, and
    the message for system information is included in a second bit field of the DCI.

12. The method of claim 11,
  wherein the DCI further comprises indication information that indicates whether the DCI includes at least one of (i) the scheduling information for paging or (ii) the message for system information.

13. The method of claim 12, further comprising:
  based on the indication information indicating that the DCI includes both (i) the scheduling information for paging and (ii) the message for system information:

transmitting a paging message based on the scheduling information for paging; and transmitting updated system information based on the message for the system information.

14. The method of claim 11, wherein the message for system information includes an indication of system information modification, an indication for earthquake tsunami warning system (ETWS) notification, or an indication of commercial mobile alert system (CMAS) notification.

15. The method of claim 11, wherein the scheduling information for paging includes time resource assignment information, frequency resource assignment information, and modulation and coding scheme (MCS) information.

16. A base station (BS) configured to operate in a wireless communication system, the BS comprising:

a transceiver;

at least one processor; and at least one computer memory operably connectable to the at least one processor and storing instructions that, when executed by the at least one processor, perform operations comprising:

transmitting downlink control information (DCI) that comprises a cyclic redundancy check (CRC) scrambled by a paging radio network temporary identifier (P-RNTI), wherein based on the DCI including both (i) scheduling information for paging and (ii) a message for system information:

the scheduling information for paging is included in a first bit of the DCI, and the message for system information is included in a second bit field of the DCI.

17. The BS of claim 16, wherein the DCI comprises indication information that indicates whether the DCI includes at least one of (i) the scheduling information for paging or (ii) the message for system information.

18. The BS of claim 17, wherein the operations further comprise:

based on the indication information indicating that the DCI includes both (i) the scheduling information for paging and (ii) the message for system information:

transmitting a paging message based on the scheduling information for paging; and transmitting updated system information based on the message for the system information.

19. The BS of claim 16, wherein the message for system information includes an indication of system information modification, an indication for earthquake tsunami warning system (ETWS) notification, or an indication of commercial mobile alert system (CMAS) notification.

20. The BS of claim 16, wherein the scheduling information for paging includes time resource assignment information, frequency resource assignment information, and modulation and coding scheme (MCS) information.

\* \* \* \* \*